United States Patent [19]

Wilmoth

[11] Patent Number: 5,060,303
[45] Date of Patent: Oct. 22, 1991

[54] OPTICAL DATA LINK SYSTEM, AND METHODS OF CONSTRUCTING AND UTILIZING SAME

[76] Inventor: Thomas E. Wilmoth, 7891 Wiggins Rd., Howell, Mich. 48843

[21] Appl. No.: 240,514

[22] Filed: Sep. 6, 1988

[51] Int. Cl.$^5$ ............................................. H04B 10/24
[52] U.S. Cl. ................................... 359/152; 359/154; 359/180; 359/184
[58] Field of Search ........................ 455/600, 606–610, 455/613, 617, 618, 619; 370/1, 34

[56] References Cited

U.S. PATENT DOCUMENTS

| | | | |
|---|---|---|---|
| 3,774,039 | 11/1973 | Price | 250/552 |
| 3,867,628 | 2/1975 | Brown | 250/206 |
| 3,967,111 | 6/1976 | Brown | 250/206 |
| 3,996,476 | 12/1976 | Lazara | 250/563 |
| 4,213,119 | 7/1980 | Ward | 455/608 |
| 4,355,423 | 10/1982 | Theall | 455/608 |
| 4,393,515 | 7/1983 | de Neumann | 455/606 |
| 4,393,516 | 7/1983 | Itani | 455/608 |
| 4,442,426 | 4/1984 | Heuschmann | 455/617 |
| 4,442,502 | 4/1984 | Friend | 455/607 |
| 4,553,267 | 11/1985 | Crimmins | 455/606 |
| 4,584,719 | 4/1986 | Miller | 455/608 |
| 4,603,975 | 8/1986 | Cinzori | 455/606 |
| 4,606,023 | 8/1986 | Dragoo | 455/608 |
| 4,688,037 | 8/1987 | Krieg . | |
| 4,704,715 | 11/1987 | Shibagaki | 370/3 |
| 4,727,600 | 2/1988 | Avakian | 455/601 |
| 4,809,303 | 2/1989 | Barndt | 455/608 |
| 4,847,873 | 7/1989 | Kowaoka | 455/601 |
| 4,856,011 | 8/1989 | Shimada | 455/608 |

FOREIGN PATENT DOCUMENTS

| | | | |
|---|---|---|---|
| 2823931 | 12/1979 | Fed. Rep. of Germany | 370/4 |
| 0148437 | 9/1982 | Japan | 455/606 |
| 0053529 | 3/1987 | Japan | 455/606 |
| 2122044 | 1/1984 | United Kingdom | 455/606 |

OTHER PUBLICATIONS

IBM Technical Disclosure Bulletin; vol. 20, #7 Dec. 1977; Closs et al.

Primary Examiner—Reinhard J. Eisenzopf
Assistant Examiner—L. Pascal
Attorney, Agent, or Firm—Irving M. Weiner; Robert M. Petrik; Joseph P. Carrier

[57] ABSTRACT

A high-speed two-way optical data link has both light-emitting and light-sensing units mounted adjacent one another in a single housing together with a timing and control unit providing all signals necessary for simultaneous transmissions and reception of data. Synchronization to a clock signal is achieved by use of edge detectors which reset to zero counters in the timing and control unit whenever a transition in data pulses is sensed. A pair of computers are linked using a program called "Crosstalk" which performs full parity checking of all data received by an associated computer. Both computers are live handshaking and asynchronous at all times.

16 Claims, 3 Drawing Sheets

OPTICAL DATA LINK SYSTEM, AND METHODS OF CONSTRUCTING AND UTILIZING SAME

This invention relates generally to optical data link systems, and more particularly to a high-speed, high data rate optical data link system for transmitting and receiving digital computer data, and the like, through free air as by an infrared light beam or other optical link.

BACKGROUND OF THE INVENTION

It is known to provide integrated circuit chips for low-speed optical data links, such as in hand-held remote control units for video cassette recorders and similar appliances, and in toy ray guns used in tag games. Typically, these known data links are key pad encoders driving a light emitting diode directly, and processing light from the diode at the receiving end by an integrated circuit chip having a 40 Kilohertz carrier frequency and about a 2 or 3 Kilohertz modulated data rate at the most.

There is a need, however, for bidirectional optical data links between computers and for use with automotive test stands, hand-held data terminals, and the like. These links must, in addition to having a simultaneous bidirectional capability, operate at very high frequencies with a resulting data rate for greater than those obtained by known data links.

*IBM Technical Disclosure Bulletin*, Vol. 20, No. 7, December 1977, in the name of Closs et al., entitled "WIRELESS CONNECTION BETWEEN A CONTROLLER AND A PLURALITY OF TERMINALS", discloses a system wherein infrared signal transmission is used for connecting a controller with a plurality of terminals in a single room. A downlink from controller to terminals is established by irradiating the room ceiling with an array of LEDs or lasers located in the controller. The diffusely reflected signal is then detected by the receivers in the terminals. An uplink from the terminals to the controller is similar where each terminal has its own array of light emitting diodes but operating on a different infrared wavelength to avoid channel interference in the case of baseband transmission. The two wavelengths are separated by an optical interference filter. As an alternative, the two channels may be separated by different carrier frequencies.

U.S. Pat. No. 4,398,515, issued in 1983, to de Neumann, entitled "PROCESSOR ARRANGEMENT", discloses a number of individual autonomous processor units wherein data communication between the individual processors takes place by means of radiated electromagnetic waves. All of the processors obtain the energy needed to operate them from a common emissive source. The information which the processor receives is obtained via an optical device and an associated receiver. Photodiodes are used and are arranged to operate in the appropriate part of the spectrum, and if required, would be infrared diodes.

The operation of the processors is synchronized by modulating the light emitted by the light source with a synchronization clock signal.

The device of U.S. Pat. No. 4,393,515, however, allocates a particular time slot for data transmission, and does not allow for simultaneous two-way communication over a link.

U.S. Pat. No. 4,553,267, issued in 1985, to Crimmins, entitled "INFRARED TELEPHONE EXTENSION MODULATION SYSTEM", discloses a portable telephone or other signaling system having a remote unit responsive to operator voice and control signals to modulate infrared emitting diodes. The modulation of the infrared diodes occurs with narrowband FM low duty cycle pulses. A modulated infrared emission is provided for remote signaling used in conjunction with complete network control to provide on-and off-hook control and network dialing functions all from a portable unit.

Again, the arrangement of the above patent fails to provide for simultaneous two-way communication over an optical data link.

U.S. Pat. No. 4,688,037, issued in 1987, to Krieg, entitled "ELECTROMAGNETIC COMMUNICATIONS AND SWITCHING SYSTEM", discloses a system for line-of-sight remote selection actuation of a wide variety of apparatuses. A sight couples the eyes of the operator and an array of control positions. The sight is mounted on the head of the operator and defines a line-of-sight for the operator. A processor is provided for converting the portions of the electromagnetic fields received by receiving antennas into the position orientation of receiving antennas with respect to radiating antennas. Using the sight, the operator selectively points to a desired control position and the processor determined which control position is being selected by determining the position and orientation of the operator's head, and thus the line-of-sight of the operator.

Although, this reference discloses a type of optical data link, it does not disclose a high speed, bidirectional computer interface for portable communication.

U.S. Pat. Nos. 3,867,628 and 3,967,111 issued in 1975 and 1976, respectively, to Brown disclose techniques for receiving pulsed light.

U.S. Pat. No. 3,996,476 issued in 1976 to Lazzara, and U.S. Pat. No. 3,774,039 issued in 1973 to Price disclose photoelectric apparatus capable of detecting reflected light. These assemblies, however, are not intended for use adjacent to an assembly emitting light in the same direction from which light is being received.

The "Optodata" 5200 system manufactured by Scientific Technologies Incorporated permits transmission of data via line-of-sight over an infrared beam to both stationery and moving targets, but requires two separate pairs of units, two at each end, for two-way communication. In addition, the second pair of units in a side-by-side arrangement must use different frequencies than the first pair of units. That is, each of the "Optodata" units, which use only a single frequency as a carrier, must be frequency matched to a paired unit and frequency mismatched to adjacent units.

SUMMARY OF THE INVENTION

The present invention provides a high-speed two-way optical data link which includes a divider chain that produces all timing and control signals for both transmitting and receiving functions. Synchronization is achieved by use of an oscillator to supply clock signals to the divider chain, and edge detector for sensing the transitions of the inputted data pulses and resetting all counters in the divider chain to the transitions so as to synchronize the system to the leading edge of the clock signals.

One embodiment uses discrete high-speed transistor-transistor logic (TTL) to incorporate a 24 Megahertz front-end oscillator which provides the system with data synchronization within 1/24 of a microsecond.

Another embodiment of the invention packages the timing and control logic in a housing together with light-emitting and sensing units to permit simultaneous and independent operation of both transmitter and receiver. The light-sensing unit uses a parabolic reflector and spaced placement of the light-emitting elements along a direction of light transmission to prevent extraneous light from reaching the light sensor. The light-emitting elements can permit an alignment angle of about 45° at approximately 30 feet by suitable dimensioning of the light-emitting unit.

Yet another embodiment of the invention utilizes transceiver units according to the present invention to link a pair of computers using a program called "Crosstalk" which performs full parity checking of all data received. Both computers are live handshaking at all times, and they are asynchronous. The system requires no clock slaving between the computers.

A still further embodiment has a light-emitting assembly and a light-sensing assembly arranged coaxially of one another to obtain a more compact and more readily aimable unit. Note, focus is fixed by sensor and dish placement. Adjustment is facilitated by a swivel mounting base on the unit, with a light path through the light-emitting assembly to the light-sensing assembly being shielded from side reflected light, light echoes, and the like.

DETAILED DESCRIPTION OF SOME EMBODIMENTS OF THE PRESENT INVENTION

Figure 1:
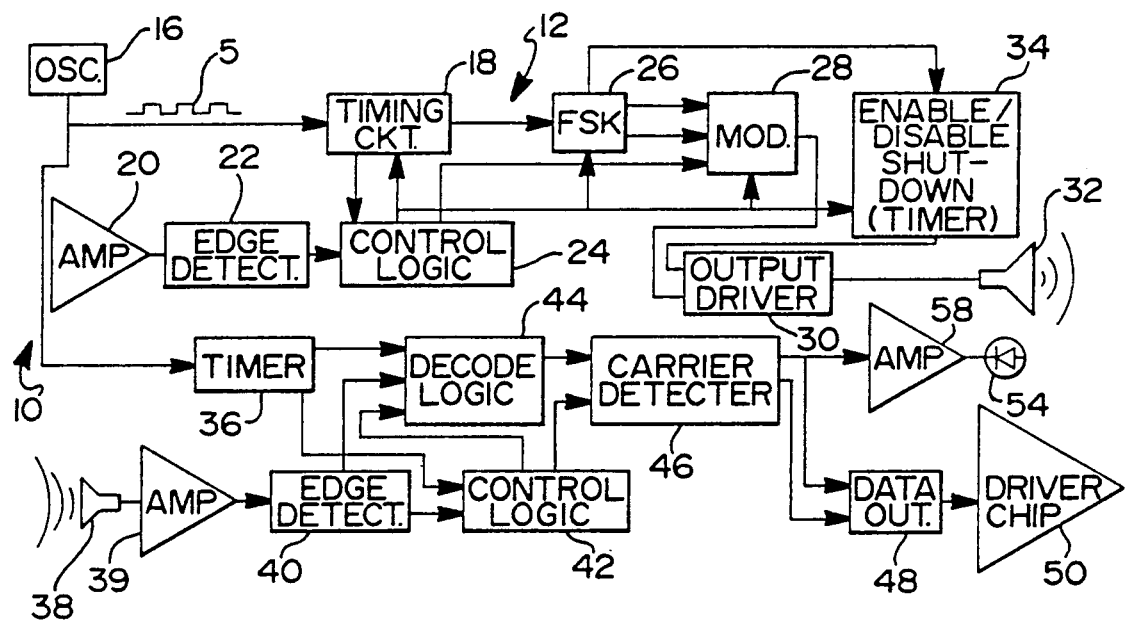
FIG. 1 is a functional block diagram showing a transceiver constructed in accordance with the present invention.

Referring now more particularly to FIG. 1 of the drawings, apparatus for high-speed communication of data according to the present invention comprises a timing and control logic divider chain 10 for simultaneously producing timing and control signals in a transmitter circuit 12 and a receiver circuit 14. In the transmitter circuit 12, an oscillator 16 applies a synchronization clock carrier frequency signal S to a timing circuit 18. Transitions of data pulses received through an amplifier stage 20 are detected by an edge detector 22, and the circuit 12 is synchronized to a leading edge of the carrier frequency, or clock signal as a function of data transitions detected through a control logic circuit 24.

Two frequency shift key timebase carrier frequencies representing respectively a high and a low input data signal are produced in a frequency shift (FSK) time base 26 connected to timing circuit 18 and control logic circuit 24. These frequencies are encoded in a modulator 28 and fed to an output driver 30 for transmission by a light-emitting assembly 32. Output driver 30 is controlled by an enable/disable shut-down circuit 34 actuated by control logic circuit 24 and time base 26 so as to disable driver 30 when no data is received in circuit 12.

Receiver circuit 14 includes a timing circuit 36 connected to oscillator 16. A light-sensing assembly 38 receives incoming data signals and passes them through an amplifier stage 39 to an edge detector 40 which detects transitions in the data signals and synchronizes circuit 14 in control logic circuit 42 in a manner similar to edge detector 22. The received data signals are fed from detector 40 to a decode logic circuit 44 where they are decoded and passed, via a carrier detector 46, to a data output circuit 48 and out to a RS 232 level converter or driver chip 50.

Carrier detector 46 can direct a signal through an amplifier 52 to a light-emitting diode (LED) 54, and the like, to provide a visual indication for a carrier frequency signal and advising an operator (not shown) that the unit is operational when nothing is being transmitted to the receiver circuit 14.

Figure 2:
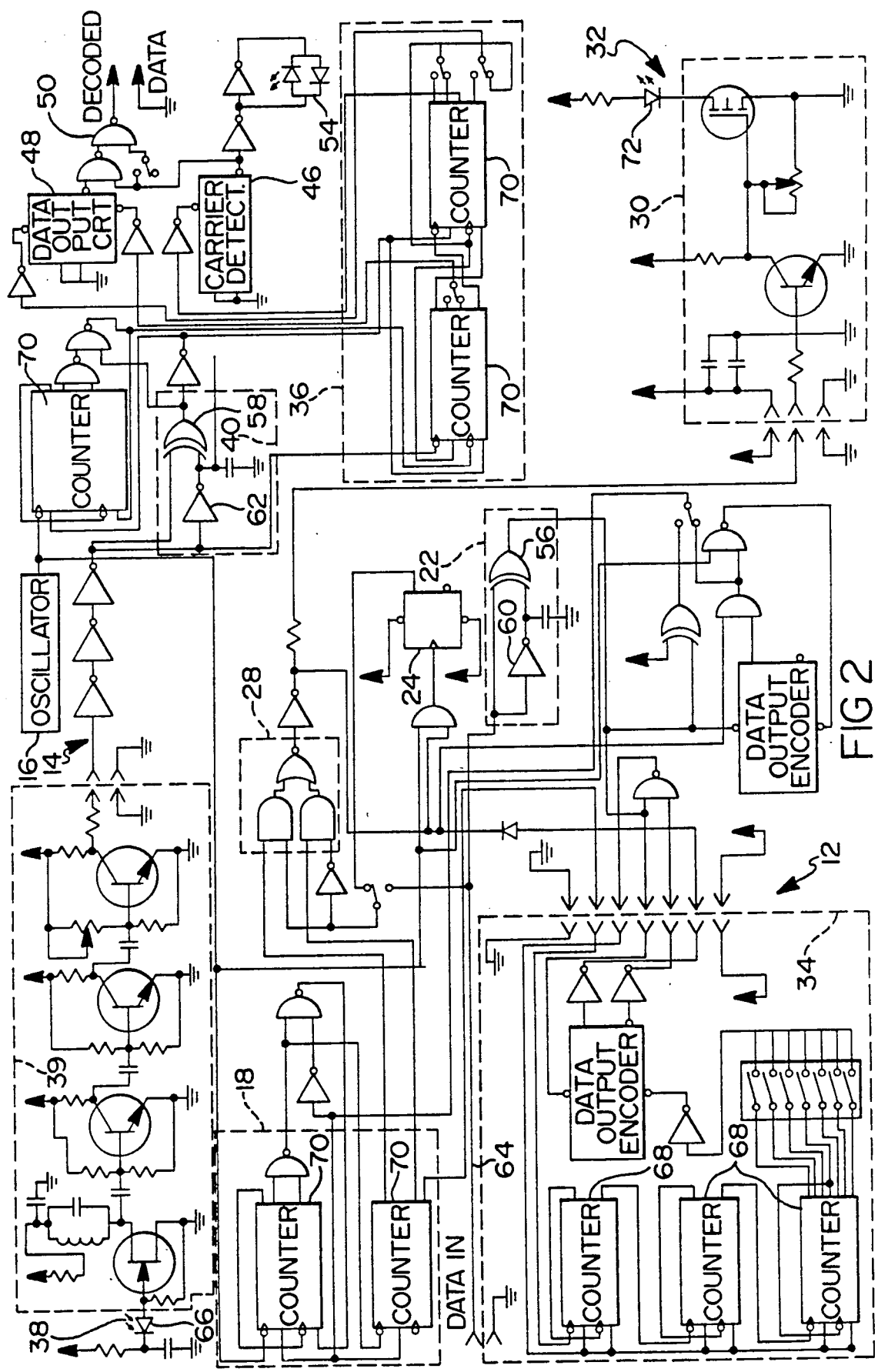
FIG. 2 is a schematic diagram showing details of a preferred embodiment of a transceiver as set forth in FIG. 1.

Although the circuits of divider chain 10 can be constructed by any suitable, known semiconductor techniques, including complementary metal oxide semiconductor techniques (CMOS), a circuit for carrying out the present invention using transistor-transistor logic (TTL) is shown in FIG. 2 of the drawings.

Oscillator 16, which can be a 24 Megahertz front-end oscillator giving data synchronization within 1/24 of a microsecond, is connected to exclusive OR gates 56 and 58 forming the edge detectors 22 and 40, respectively. Inserted into one input of each gate 56 and 58 is a respective inverter 60 and 62 to invert a signal to an associated gate 22, 40 received either from data input amplifier 20 (FIG. 1) over a line 64, or from a photodiode 66 forming light sensing assembly 38.

Whenever the respective edge detectors 22 and 40 detect a transition in an incoming data pulse (that is, whenever a data pulse goes from 0 to 1 or from 1 to 0) the associated gate 56, 58 outputs a signal which resets the counter 68 and 70, respectively, to zero so as to synchronize the transitions to the leading edge of a clock pulse from oscillator 16.

The time base 26 functions to reduce the carrier frequency to two reduced frequencies representing high and low, or 0 and 1, levels of data signals, respectively. When a 24 Megahertz oscillator is employed for oscillator 26, frequencies of 500 kilohertz and 250 kilohertz have been found satisfactory for the output of time base 26. A ratio of 2 to 1 is effective to minimize a phase beat frequency shift seen in reconstructed data, thereby maximizing use of the circuit at high frequencies.

Advantageously, output driver 30 will preferably, but not necessarily, be an infrared driver, as illustrated, and will drive an infrared light-emitting diode (LED) 72, and the like.

With single phase +12 to +15 volt operation, transmitter 12 current can range between 70 milliamperes and 100 milliamperes, and receiver and logic maximum current of <100 milliamperes. The total transmitter/receiver delay in such a system was measured as 4 microseconds.

Figure 3:
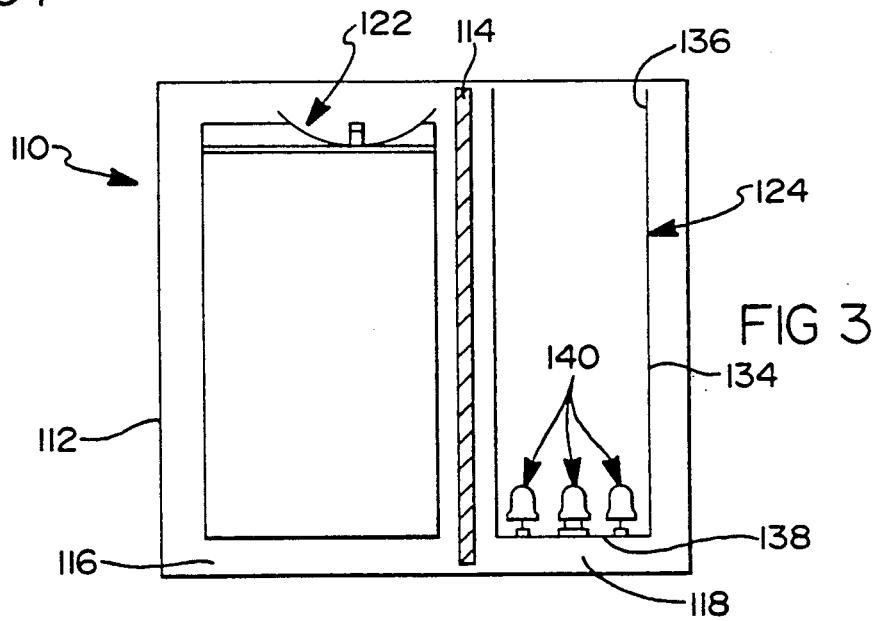
FIG. 3 is a diagrammatic vertical sectional view showing a preferred manner of packaging an array of light-emitting diodes (LED's) and a photosensor for simultaneous transmission and receiving in accordance with the present invention.

Referring now more particularly to FIG. 3 of the drawings, a two-way optical data link 110 in accordance with the present invention comprises a housing 112 defining a hollow interior divided by a wall 114 into adjacent compartment 116 and 118. Disposed in compartment 116 together with a timing and control logic system 120, which can be similar to system 10, is a light sensing assembly 122, equivalent to assembly 38, arranged for receiving light from a source (not shown) spaced in a given direction from housing 112. This direction would be expanded as seen in FIG. 3. Disposed in the compartment 118 is a light-emitting assembly 124 arranged for directing light in the same direction, upwardly as shown, as light sensing assembly 122 receives light. The light sensing assembly 122 is shielded from light emitted by assembly 124 in a manner to become clear below.

Figure 4:
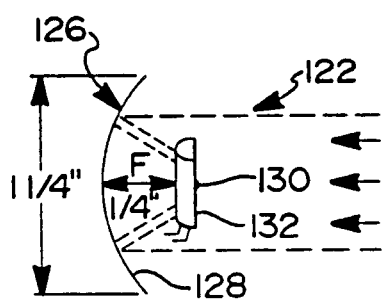
FIG. 4 is a diagrammatic sectional view showing the photosensor assembly of FIG. 3 in greater detail.

Referring to FIG. 4, light sensing assembly 122 includes a parabolic reflector 126 mounted on housing 112 so as to face outwardly therefrom, as forming a concave surface 128 defining a focal point 130 oriented in the direction of light reception. Mounted on reflector 126 at a focal point 130 is, for example, an infrared photodiode 132, equivalent to photodiode 66, for detecting incoming light rays r reflected from surface 128 of the reflector 126 toward focal point 130.

The distance, or focal length, between point 130 and the surface 128 of reflector 126 can be, for example, $\frac{1}{4}$ of an inch.

Figure 5:
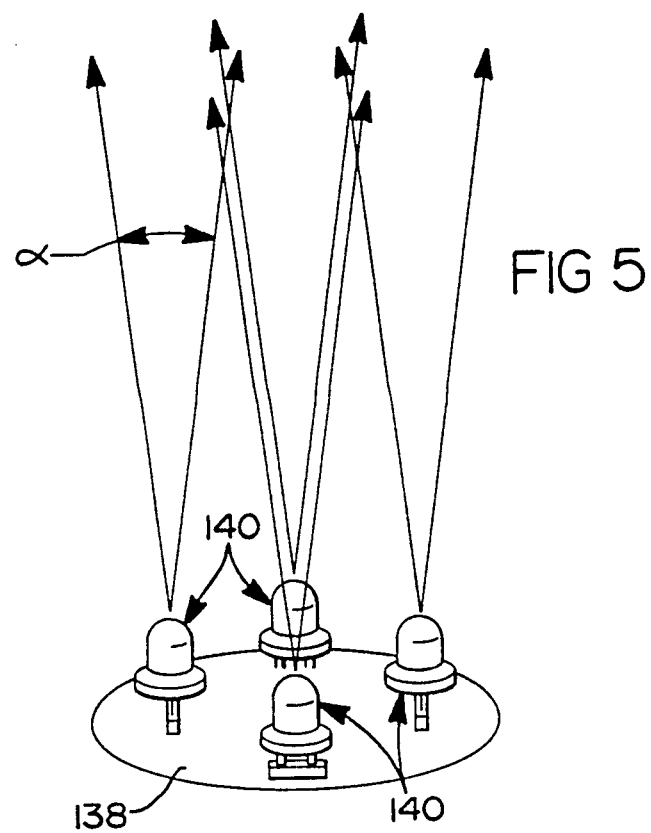
FIG. 5 is a diagrammatic perspective view showing the LED's of FIG. 3 in greater detail.

As seen in FIG. 3, the light-emitting assembly 124 comprises a sleeve or tube 134 open at an end 136 arranged adjacent assembly 122, and closed at the opposed end by a base plate 138 on which are arranged one or more light-emitting diodes 140. Four infrared diodes, each equivalent to diode 72, are illustrated in FIG. 5 so as to be in spaced relation to assembly 122 in the light-emitting direction. By proper dimensioning of tube 134, and placement of diodes 140 on base plate 138, each diode 140 can provide an alignment angle $\alpha$ of 45° at about 30 feet distance from housing 112.

Although not illustrated, housing 112 can be provided with a standard pin base for facilitating mounting of unit 110 on an associated computer (not shown) and the like. A 25-pin base configuration has been found suitable.

Unit 110 is very compact, with dimensions of 2"×3"×4" being obtainable for housing 112. Data rates as high as 300K bits per second are possible without data synchronization. A unit 110 is highly immune to ambient light and heat interference, and can transmit and receive over, for example, about 10 meters distance. A unit 110 can be used with automotive test and diagnostic systems, hand-held data logging systems, portable PC's and terminals, office local area networks (LAN), or any application where direct wire transfer of large volumes of data are impossible or hazardous.

A high-speed two-way data link according to the present invention has been used asynchronously with a like unit in live handshaking operation, i.e., continuous two-way communication-between two "IBM" XT computers (not shown) running at, for example, 9600 baud. A program called "Crosstalk" was used with each computer to accomplish parity checking on data received by each computer.

A unit 110 is capable of being interfaced with other digital equipment by transistor-transistor logic (TTL), complimentary metal oxide semiconductor (CMOS) techniques, and serial communication standards RS 232 and RS 422.

Figure 6:
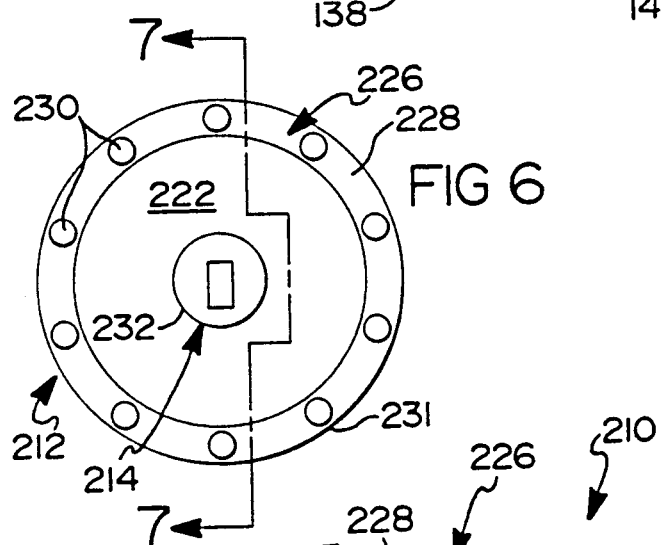
FIG. 6 is a diagrammatic, front elevational view of a further embodiment of a high-speed two-way data link according to the present invention.
Figure 7:
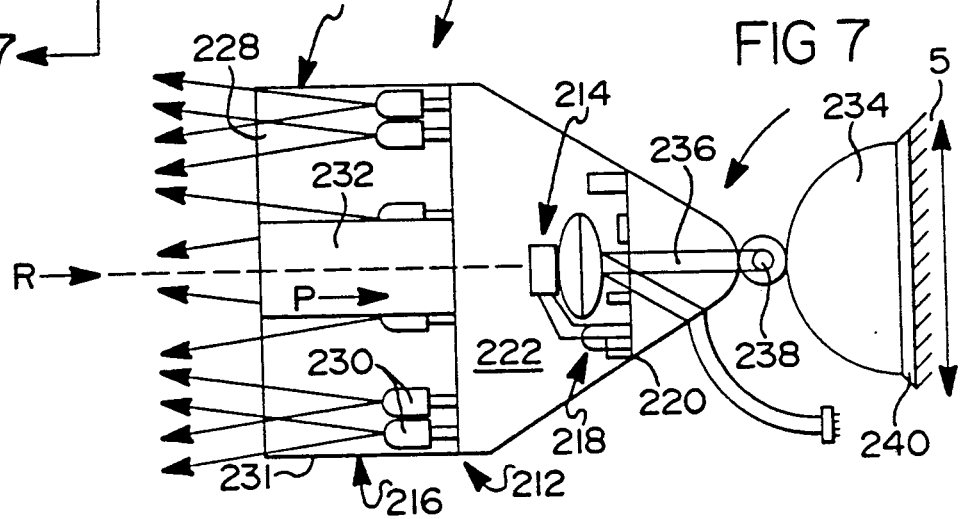
FIG. 7 is a diagrammatic view partially in a cross section taken generally along the line 7—7 of FIG. 6.

FIGS. 6 and 7 of the drawings illustrate a more compact and readily focusable apparatus 210 according to the present invention, comprising a housing 212 having arranged therein a light-sensing assembly 214, which can be constructed from a reflector and photodiode in the manner of light-sensing assembly 122, and a light-emitting assembly 216. Also disposed within housing 212 is a timing and control circuit 218 which can be constructed in the identical manner as divider chain 10.

As can be seen from FIGS. 6 and 7, assemblies 214 and 216 are arranged coaxially of one another for transmitting and receiving light in a common direction along a common axis.

The housing 212 includes a conically-shaped casing 220 forming a chamber 222 arranged diverging to an open rim 224 for permitting light R being received to pass into the chamber 222 of casing 220. The light-sensing assembly 214 is disposed within chamber 222 of the casing 220, and is arranged for sensing light R being received, while circuit 218 is placed in the casing 220 rearwardly of assembly 214.

Housing 212 further includes an annular member 226 defining an axis a—a and mounted on casing 220 at the open rim 224 thereof and extending away from the casing 220 in a direction of emitted light E. Mounted on a base 228 of annular member 226 are a plurality of light sources 230, ten being shown disposed symmetrically about the base 228 of annular member 226. Light sources 230 can be similar to, for example, LED's 132 (FIG. 4).

A front portion 231 of annular member 226 can be constructed in the manner of a lens from suitable transparent materials by known techniques, with it being possible to leave the front of member 226 open if desired. Advantageously, side walls of the front portion 231 can converge away from base 228, with the latter being configured accordingly, in order to focus light sources 230 at an optimum distance.

A hollow cylinder 232, constructed from an opaque material or suitably coated, has a longitudinal axis I—I disposed coaxially with axis a—a of and generally coextensive with annular member 226 for defining a shielded light path P through the annular member 226 and into the chamber 222 of casing 220. Cylinder 232 thus forms a narrow channel input to light-sensing assembly 214 which cuts down on side reflections, echoes, and the like created by light-emitting assembly 216.

Housing 212 is mounted on a suitable support 5 as by a swivel base 234 attached to casing 220 as by a U-shaped bracket 236 and a swivel joint 238 to pivotally mount casing 220 on base 234 and to permit adjustment of casing 220 and annular member 226 relative to a cooperating apparatus 210 for facilitating aiming of light-sensing assembly 214 and light-emitting assembly 216 on the cooperating apparatus 210. Focusing is made easier by the coaxial alignment of the assemblies 214 and 216, which eliminates parallax problems. Base 234 can be provided with a slide 240, and the like, to facilitate mounting of apparatus 210 on a support S.

For example, a seven conductor cable 242 extends from the timing and control circuit 218 for selective connection of same, for example, to digital processor circuiting (not shown) in a known manner.

The above description should be considered exemplary and that of preferred embodiments only. The true spirit and scope of the present invention should be determined by reference to the appended claims. It is desired to include within the appended claims all modifications and variations of the invention which come within the proper scope of the invention.

I claim:

1. Apparatus for high speed communication of data, comprising, in combination:
   (a) oscillator means for producing a synchronization clock signal;
   (b) timing and control means connected to and receiving clock signals from the oscillator means for producing timing and control signals, and including divider circuit first means for producing simultaneous transmitting and receiving timing and control signals;
   (c) synchronization means connected to the timing and control means for synchronizing the same to the clock signal of the oscillator means;
   said divider change circuit means includes a second transmitter circuit means for producing two frequency shift key time base carrier frequency representing respectively a high and low input data signal;
   said timing and control means further includes a second receiver circuit means, with each first and second transmitter circuit means and said first and second receiver circuit means including at least one counter;
   wherein said synchronization means includes edge detector means connected to said at least one counter of the timing and control means for receiving data signal and clearing said at least one counter on detection of transitions of the data received between high and low states;
   wherein said oscillator means includes a 24 Megahertz front-end oscillator;
   at least one light-emitting diode means connected to the transmitter circuit for transmitting light;
   at least one photosensor means connected to the receiver circuit for receiver circuit for receiving light;
   said diode means and photosensor means being arranged adjacent one another and directed substantially in a common direction.

2. Apparatus as defined in claim 1, wherein:
said photosensor means includes a parabolic reflector forming a concave surface defining a focal point;
said concave surface being arrangeable for receiving light to be sensed; and
a photodetector disposed at the focal point of the reflector.

3. Apparatus as defined in claim 2, wherein:
said light-emitting diode means includes a plurality of diodes, each arranged for defining an alignment angle of approximately 45° at approximately 30 feet from said diode means.

4. Apparatus as defined in claim 1, wherein:
said synchronization means includes edge detector means connected to said timing and control means for receiving data signals and synchronizing said timing and control means to said oscillator means on detection of transitions of the data received between high and low states.

5. Apparatus as defined in claim 1, wherein:
said oscillator means includes a 24 Megahertz front-end oscillator.

6. Apparatus as defined in claim 1, further including:
a housing; and
light-emitting means and light-sensing means arranged into said housing adjacent one another and each connected to said timing and control means for respectively transmitting light to and receiving light from an associated apparatus spaced from said housing;
said light-sensing means being arranged shielded from said light-emitting means.

7. A method of using a high-speed two-way data link as defined in claim 1, comprising the steps of:
   (a) arranging two computers in a line-of-sight relationship;
   (b) providing each said computer with a data link as defined in claim 1, each data link continually communicating with the other data link asynchronously; and
   (c) parity checking data communicated.

8. A method as set forth in claim 7, wherein:
said step of parity checking includes the step of programming each computer to perform a parity check on data received.

9. Apparatus for the simultaneous and independent transmission and reception of signals over an optical data link, comprising in combination;
   (a) a housing;
   (b) light-sensing means arranged on said housing for receiving light from a source spaced in a given direction from said housing; and
   (c) light-emitting means arranged on said housing adjacent said light-sensing means for directing light substantially in the same given direction as the light-sensing means receives light, said light-sensing means being arranged shielded from light from said light-emitting means;
   said light-sensing means includes a parabolic reflector mounted on said housing and forming a concave surface defining a focal point, and a photodetector disposed at said focal point of said reflector.

10. Apparatus as defined in claim 9, wherein:
said light-emitting means includes at least one light-emitting diode arranged in said housing in spaced relation to said light-sensing means in said given direction for providing an alignment angle of approximately 45° at approximately 30 feet distance from said housing.

11. Apparatus as defined in claim 9, wherein:
said housing includes swivel base means for permitting mounting of said housing on a support; and
casing means supporting said light-sensing means and light-emitting means and pivotally connected to said swivel base means for being adjusted to aim said light-sensing means and light emitting means at a cooperating apparatus.

12. Apparatus as defined in claim 9, wherein:
said light-emitting means and said light-sensing means are arranged substantially coaxially to one another.

13. Apparatus as defined in claim 12, wherein:
said housing inlcudes conically-shaped casing means forming a chamber arranged diverging to an open rim for permitting light being received to pass into said chamber of said casing means;
said light-sensing means being disposed within said chamber of said casing means and arranged for receiving light being received.

14. Apparatus as defined in claim 13, wherein:
said housing further includes an annular member defining an axis and mounted on said casing means at the open rim thereof, and arranged extending away from said casing means in a direction of light transmission and reception; and said light-emitting means including a plurality of light sources disposed substantially symmetrically around said annular member.

15. Apparatus as defined in claim 14, wherein:

said housing further includes hollow cylinder means having a longitudinal axis, and disposed coaxially with said axis of and generally coextensive with said annular member for defining a shielded light path through said annular member and into said chamber of said casing means.

16. Apparatus as defined in claim 15, wherein:

said housing further includes swivel base means for permitting mounting of said housing on a support, with said casing means being pivotally mounted on said swivel base means and arranged for being adjusted to focus said light-emitting means and light-sensing means on a cooperating apparatus.

* * * * *